(12) United States Patent
Zhao

(10) Patent No.: US 10,896,309 B2
(45) Date of Patent: Jan. 19, 2021

(54) METHOD AND TERMINAL DEVICE FOR MULTI-ANGLE SCANNING, AND COMPUTER READABLE STORAGE MEDIUM

(71) Applicant: SHENZHEN PAX SMART NEW TECHNOLOGY CO., LTD., Guangdong (CN)

(72) Inventor: Yike Zhao, Guangdong (CN)

(73) Assignee: SHENZHEN PAX SMART NEW TECHNOLOGY CO., LTD., Guangdong (CN)

( * ) Notice: Subject to any disclaimer, the term of this patent is extended or adjusted under 35 U.S.C. 154(b) by 142 days.

(21) Appl. No.: 16/349,380

(22) PCT Filed: Aug. 4, 2017

(86) PCT No.: PCT/CN2017/096092
§ 371 (c)(1),
(2) Date: May 13, 2019

(87) PCT Pub. No.: WO2018/227737
PCT Pub. Date: Dec. 20, 2018

(65) Prior Publication Data
US 2019/0278965 A1    Sep. 12, 2019

(30) Foreign Application Priority Data

Jun. 14, 2017   (CN) .......................... 2017 1 0448502

(51) Int. Cl.
*G06K 7/14*   (2006.01)
(52) U.S. Cl.
CPC ......... *G06K 7/1456* (2013.01); *G06K 7/1413* (2013.01)
(58) Field of Classification Search
CPC ..... G06K 7/1413; G06K 7/1456; G06K 7/146
(Continued)

(56) References Cited

U.S. PATENT DOCUMENTS

| 5,988,505 A | 11/1999 | Shellhammer |
| 2015/0317060 A1* | 11/2015 | Debets ............... G06Q 30/0267 715/835 |

FOREIGN PATENT DOCUMENTS

| CN | 101840496 | 9/2010 |
| CN | 101908121 | 12/2010 |
| CN | 104933387 | 9/2015 |

OTHER PUBLICATIONS

International Search Report filed in PCT/CN2017/096092 dated Mar. 14, 2018.

\* cited by examiner

*Primary Examiner* — Toan C Ly
(74) *Attorney, Agent, or Firm* — Rankin, Hill & Clark LLP

(57) ABSTRACT

A method and a terminal device for multi-angle scanning, and a computer readable storage medium, relates to the technical field of scanning one-dimensional codes. The method includes: acquiring a scanning angle when scanning an image to be scanned (101); uploading the scanning angle to an upper computer to call a suitable obliquely positioned coordinate system by the upper computer, where the suitable obliquely positioned coordinate system is an obliquely positioned coordinate system in an obliquely positioned coordinate system set corresponding to a saved deflected angle having a smallest difference value with the scanning angle (102); receiving the suitable obliquely positioned coordinate system returned back by the upper computer (103); and acquiring image feature data of the image to be scanned by using coordinate values of pixels of the image to be scanned in the suitable obliquely positioned coordinate system (104).

18 Claims, 4 Drawing Sheets

(58) Field of Classification Search
USPC .................................................. 235/462.01
See application file for complete search history.

METHOD AND TERMINAL DEVICE FOR MULTI-ANGLE SCANNING, AND COMPUTER READABLE STORAGE MEDIUM

TECHNICAL FIELD

The present application pertains to the technical field of scanning one-dimensional codes, and particularly relates to a method and a terminal device for multi-angle scanning, and a computer readable storage medium.

BACKGROUND

A one-dimensional code is a label composed of a set of regularly arranged bars, spaces and corresponding characters. The "bars" refer to a part with low light reflectivity, while the "spaces" refer to a part with high light reflectivity. The data composed of the bars and the spaces expresses certain information, and can be read by specific devices, and thus be converted into binary information or decimal information compatible with computers. At present, the solutions of performing soft decoding for one-dimensional codes mostly convert a collected image with YUV (YCrCb, a method for coding TV colors) format into a gray-scale image and then perform binaryzation through a one-dimensional code embedded processor. The binary image conforming to codeword characteristics are decoded after being scanned. A good decoding effect can be achieved only when the binary image is scanned to determine whether it conforms to the codeword characteristics, and when the image data collected by the sensor is positioned horizontally or vertically. However, in the process of practical application, there exists scanning from an irregular angle when the user scans an image. At this time, the soft decoding algorithm supporting traditional horizontal or vertical scanning cannot support soft decoding very well. In order to support scanning a one-dimensional code from multiple angles, it is necessary to change or add a scanning algorithm. However, because the processor has limited capacity for embedded systems, there is a problem of long scanning time when adding a scanning algorithm.

The problem described above needs to be solved urgently.

Technical Problem

With regard to the deficiency that there is long scanning time when adding a scanning algorithm due to the processor with limited capacity for embedded systems, the present application provides a method and a terminal device for multi-angle scanning, and a computer readable storage medium.

Technical Solutions for the Problem

Technical Solutions

A first aspect of the embodiments of the present application provides a method for multi-angle scanning, which includes:

acquiring a scanning angle when scanning an image to be scanned;

uploading the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

receiving the suitable obliquely positioned coordinate system returned back by the upper computer; and acquiring image feature data of the image to be scanned by using coordinate values of pixels of the image to be scanned in the suitable obliquely positioned coordinate system.

Further, before acquiring the scanning angle when scanning the image to be scanned, the method includes:

scanning, by the upper computer, the image with specified resolution horizontally or vertically, and acquiring standard pixel values of the image;

generating, by the upper computer, a standardly positioned coordinate system of the image according to the standard pixel values; and saving, by the upper computer, the standardly positioned coordinate system multiplied by a plurality of linear slope equations to generate the obliquely positioned coordinate system set.

Further, the step of saving, by the upper computer, the standardly positioned coordinate system multiplied by a plurality of linear slope equations to generate the obliquely positioned coordinate system set specifically includes:

specifying a plurality of deflected angles configured to be saved by the upper computer;

acquiring linear slope equations corresponding to the deflected angles according to each of the deflected angles;

saving the standardly positioned coordinate system multiplied by the plurality of linear slope equations to generate the obliquely positioned coordinate system set; and saving coordinate values of each of the obliquely positioned coordinate systems.

Further, the obliquely positioned coordinate system corresponding to one saved deflected angle having the smallest difference value with the scanning angle specifically includes:

determining a section where the scanning angle is positioned, wherein the section is set by two of the saved deflected angles;

determining one of the two of the deflected angles closest to the scanning angle as a suitable deflected angle; and acquiring the obliquely positioned coordinate system corresponding to the deflected angle according to the suitable deflected angle.

Further, the step of receiving the suitable obliquely positioned coordinate system returned back by the upper computer specifically comprises:

receiving the suitable obliquely positioned coordinate system returned back by the upper computer; and saving the coordinate values of the suitable obliquely positioned coordinate system.

A second aspect of the embodiments of the present application provides a device for multi-angle scanning, which includes:

a first acquisition module, configured to acquire a scanning angle when scanning an image to be scanned;

a call module, configured to upload the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

a reception module, configured to receive the suitable obliquely positioned coordinate system returned back by the upper computer; and a second acquisition module, configured to acquire image feature data of the image to be scanned by using coordinate values of pixels of the image to be scanned in the suitable obliquely positioned coordinate system.

Further, the device further includes:

an acquisition unit, configured to scan, by the upper computer, the image with specified resolution horizontally or vertically, and to acquire standard pixel values of the image;

a first generation unit, configured to generate, by the upper computer, a standardly positioned coordinate system of the image according to the standard pixel values; and a second generation unit, configured to save, by the upper computer, the standardly positioned coordinate system multiplied by a plurality of linear slope equations to generate the obliquely positioned coordinate system set.

Further, the reception module includes:

a backhauling unit, configured to receive the suitable obliquely positioned coordinate system returned back by the upper computer; and a save unit, configured to save the coordinate values of the suitable obliquely positioned coordinate system.

A third aspect of the embodiments of the present application provides a terminal device for multi-angle scanning, which includes a memory, a processor and a computer program stored in the memory and executable by the processor. The processor, when executing the computer program, implements the following steps of:

acquiring a scanning angle when scanning an image to be scanned;

uploading the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

receiving the suitable obliquely positioned coordinate system returned back by the upper computer; and acquiring image feature data of the image to be scanned by using coordinate values of pixels of the image to be scanned in the suitable obliquely positioned coordinate system.

A fourth aspect of the embodiments of the present application provides a computer readable storage medium stored with a computer program. The computer program, when executed by a processor, implements the following steps of:

acquiring a scanning angle when scanning an image to be scanned;

uploading the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

receiving the suitable obliquely positioned coordinate system returned back by the upper computer; and acquiring image feature data of the image to be scanned by using coordinate values of pixels of the image to be scanned in the suitable obliquely positioned coordinate system.

Beneficial Effects of the Application

Beneficial Effects

Compared with the prior art, the beneficial effects existed in the present application lie in that: the present application scans a one-dimensional code image having a deflected angle by an embedded system, and directly makes the coordinates of the one-dimensional code image having the deflected angle correspond to an angle coordinate value of an obliquely positioned coordinate system corresponding to the deflected angle, thereby acquiring image feature data of the scanned image, which, on the one hand, reduces the time for the embedded system to correct the angle of the image, accelerates the speed of feature recognition for the one-dimensional code and improves user experience; while on the other hand, accelerates recognition speed for the one-dimensional code by using the soft decoding, avoids the cost spent by using hardware decoding and reduces the production cost for the one-dimensional code recognition.

BRIEF DESCRIPTION OF THE DRAWINGS

Description of the Drawings

In order to more clearly illustrate the technical solutions in embodiments of the present application, the drawings to be used in the description of the embodiments or the prior art will be briefly introduced below. Obviously, the drawings described below are only some embodiments of the present application, and other drawings may also be obtained for those skilled in the field in accordance with these drawings without creative effort.

Figure 1:
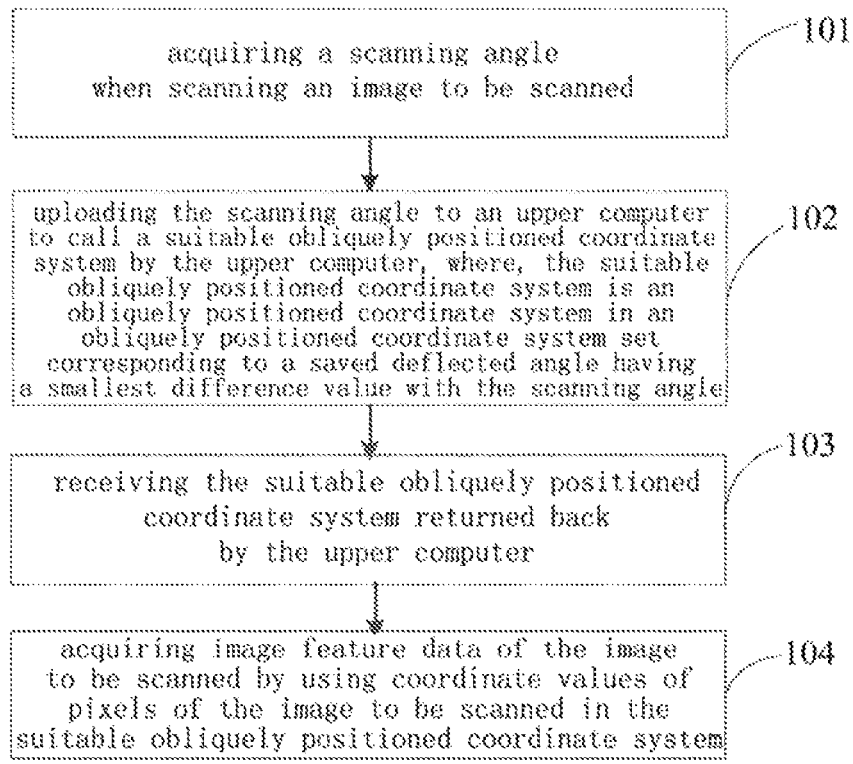

FIG. 1 is a flowchart diagram of implementing the method for multi-angle scanning provided by an embodiment of the present application.

Figure 2:
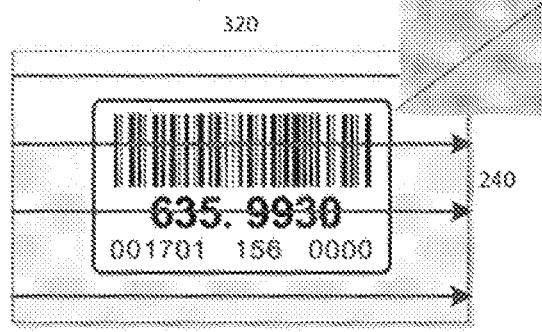
Figure 2:
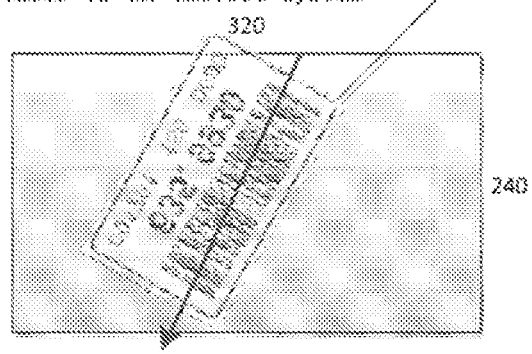
Figure 2:
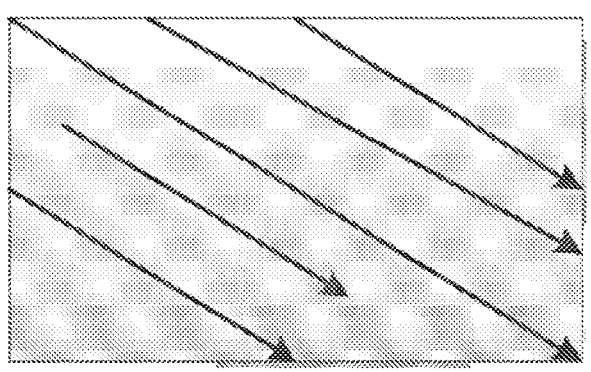

FIG. 2 (a) is a standard coordinate system with a resolution of 320*240 simulated in the embodiment provided in FIG. 1.

FIG. 2 (b) is an obliquely positioned coordinate system having a deflected angle, with a resolution of 320*240 simulated in the embodiment provided in FIG. 1.

FIG. 2 (c) is a schematic diagram of a scanning angle of several scanning paths in the obliquely positioned coordinate system having a deflected angle provided in FIG. 1.

Figure 3:
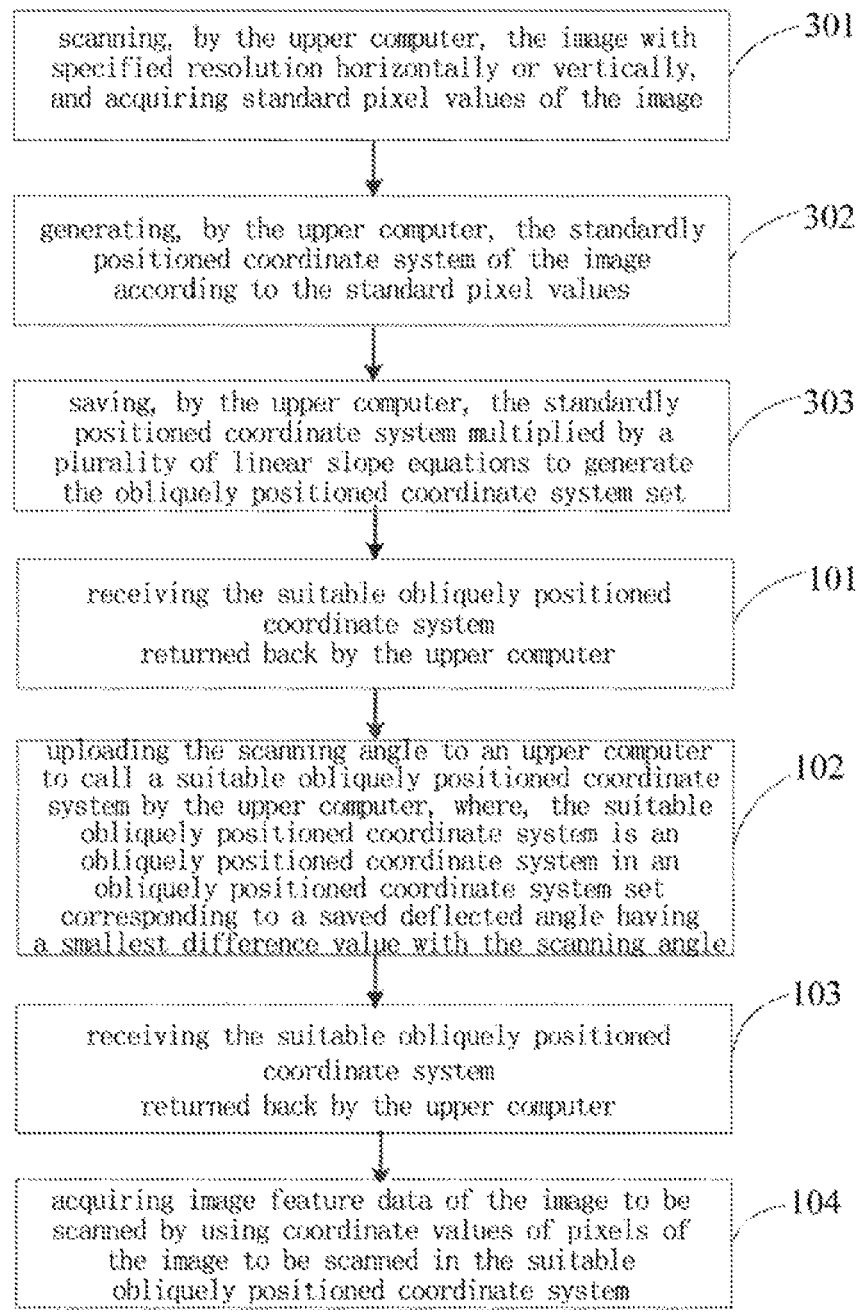

FIG. 3 is a flowchart diagram of implementing the method for multi-angle scanning provided by another embodiment of the present application.

Figure 4:
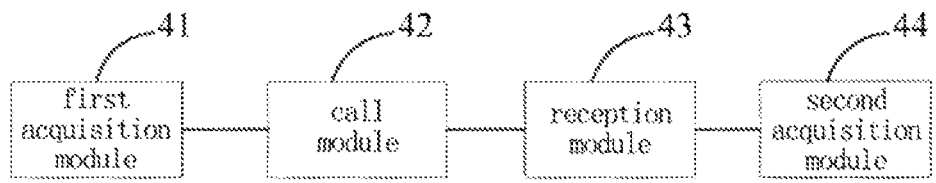

FIG. 4 is a schematic diagram of the device for multi-angle scanning provided by an embodiment of the present application.

Figure 5:
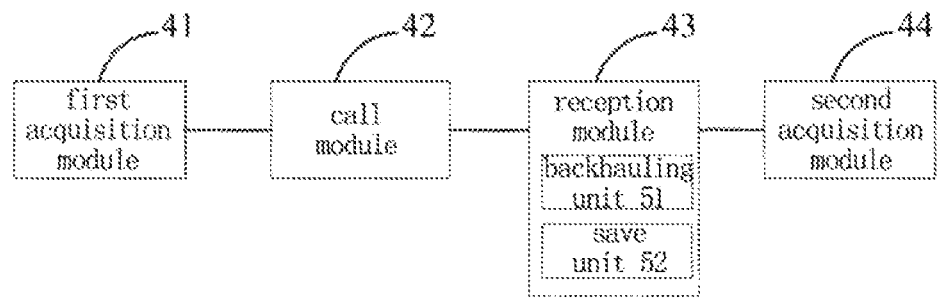

FIG. 5 is a schematic diagram of the device for multi-angle scanning provided by another embodiment of the present application.

Figure 6:
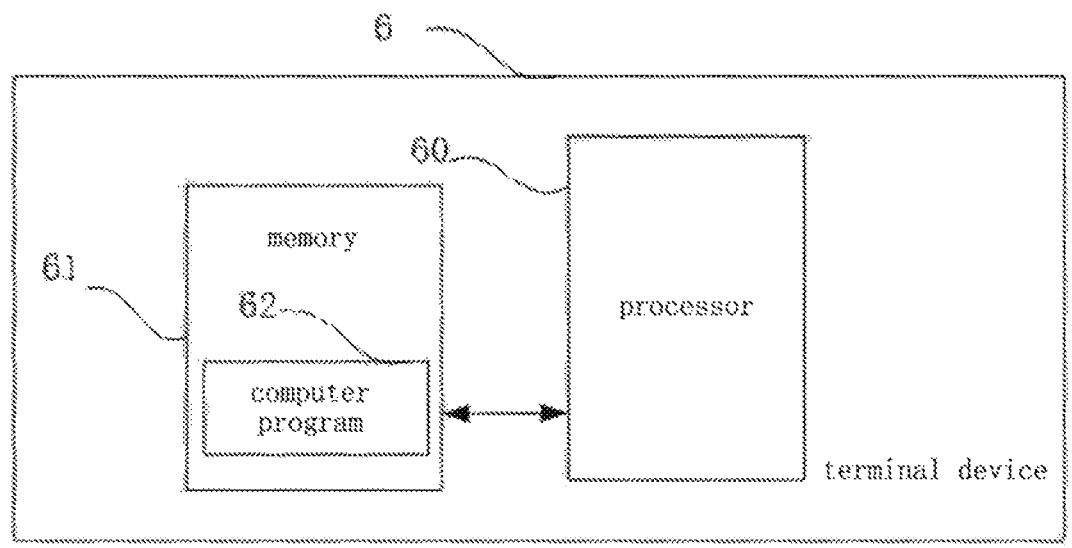

FIG. 6 is a schematic diagram of the terminal device for multi-angle scanning provided by an embodiment of the present application.

EMBODIMENTS OF THE APPLICATION

Implementations of the Present Application

In the following description, for a purpose of illustration but not limitation, specific details such as a specific system architecture or technique or the like are provided, so as to understand the embodiments of the present application thoroughly. However, it should be understood by those skilled in the art that the present application may be implemented in other embodiments without these specific details. In other instances, detailed descriptions of a well-known system, device, circuit and method are omitted such that the description of the present application is not obscured by unnecessary details.

In order to explain the technical solutions of the present application, the following description will be made by way of specific embodiments.

Actual tests found that when computing capacity of a embedded processor is limited, it will take a long time to calculate scanning paths of a image with different angles and different slopes. If the calculation time of this part has been processed and completed in an upper computer end, then image feature code identification may be performed for the image acquired through scanning a one-dimensional code and input by the embedded end, which is a source of the idea of the present application.

FIG. 1 is a flowchart diagram of implementing the method for multi-angle scanning provided by an embodiment of the present application. As shown in FIG. 1, the executor of this embodiment of the present application is an embedded system, and the method for multi-angle scanning provided by this embodiment of the present application may include:

101. acquiring a scanning angle when scanning an image to be scanned;

102. uploading the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

103. receiving the suitable obliquely positioned coordinate system returned back by the upper computer; and 104. acquiring image feature data of the image to be scanned by using coordinate values of pixels of the image to be scanned in the suitable obliquely positioned coordinate system.

Specifically, the above step is to directly copy a set of virtual coordinate values saved in the corresponding coordinate system set on the upper computer to embedded software, and to record scanning paths when the embedded system scans a code through using the coordinate data, thereby obtaining an image feature of the one-dimensional code. Because the camera of the embedded system generally adopts a fixed resolution, and the resolution of the scanned image is constant when actually used, so a coordinate similar to the image to be scanned may be simulated on the upper computer end in advance by using image algorithm software. Further, the image with a specified resolution is scanned horizontally or vertically; the coordinate values of all the pixels of the image are recorded to generate a standardly positioned coordinate system. As shown in FIG. 2(a), an image with a resolution of 320×240 is used, and a coordinate system with the resolution of 320×240 matching with the resolution of the camera is simulated by using VS (Microsoft Visual Studio, drawing software) on the computer end. The several parallel lines in the horizontal direction in FIG. 2(a) are standard scanning paths, and the coordinates may be directly calculated by scanning. The general decoding process is that: the image acquired by the camera is converted into a grayscale image, and then binarization is performed for the acquired image data according to the scan paths, and it is determined whether a barcode feature is met, and decoding is performed according to a barcode specification if it is met.

In the process of actually scanning a one-dimensional code picture, there often exists scanning the one-dimensional code pattern by using scanning paths with an deflected angle is often encountered, as shown in FIG. 2(b). In order to scan the one-dimensional code pattern (to be scanned) with an deflected angle, it is necessary to construct a coordinate of the oblique scanning path such as in FIG. 2(b) in advance to improve the decoding efficiency of the embedded system. Further, oblique lines of different slopes are drawn by using a line drawing function. Because the coordinate system for drawing lines is the same as the actual embedded system, so the coordinates of the oblique lines may be used as the coordinates of the scanning paths. As shown in FIG. 2(b), the obliquely positioned coordinate system (x, y) is virtualized out in advance by using the VS in the computer, and then a coordinate set of the obliquely positioned coordinate system is copied into the embedded system. In actual use, the scanning paths can be constructed based on an actual test result. As shown in FIG. 2(c), the coordinates of the plurality of long oblique lines are: x(x0, x1, x2 . . . ) y(y0, y1, y2 . . . )

{0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400},

{240, 239, 238, 238, 237, 237, 236, 235, 235, 234, 234, 233, 232, 232, 231, 231, 230, 229, 229, 228, 228, 227, 226, 226, 225, 225, 224, 223, 223, 222, 222, 221, 220, 220, 219, 219, 218, 217, 217, 216, 216, 215, 214, 214, 213, 213, 212, 211, 211, 210, 210, 209, 208, 208, 207, 207, 206, 205, 205, 204, 204, 203, 202, 202, 201, 201, 200, 199, 199, 198, 198, 197, 196, 196, 195, 195, 194, 193, 193, 192, 192, 191, 190, 190, 189, 189, 188, 187, 187, 186, 186, 185, 184, 184, 183, 183, 182, 181, 181, 180, 180, 179, 178, 178, 177, 177, 176, 175, 175, 174, 174, 173, 172, 172, 171, 171, 170, 169, 169, 168, 168, 167, 166, 166, 165, 165, 164, 163, 163, 162, 162, 161, 160, 160, 159, 159, 158, 157, 157, 156, 156, 155, 154, 154, 153, 153, 152, 151, 151, 150, 150, 149, 148, 148, 147, 147, 146, 145, 145, 144, 144, 143, 142, 142, 141, 141, 140, 139, 139, 138, 138, 137, 136, 136, 135, 135, 134, 133, 133, 132, 132, 131, 130, 130, 129, 129, 128, 127, 127, 126, 126, 125, 124, 124, 123, 123, 122, 121, 121, 120, 120, 119, 118, 118, 117, 117, 116, 115, 115, 114, 114, 113, 112, 112, 111, 111, 110, 109, 109, 108, 108, 107, 106, 106, 105, 105, 104, 103, 103, 102, 102, 101, 100, 100, 99, 99, 98, 97, 97, 96, 96, 95, 94, 94, 93, 93, 92, 91, 91, 90, 90, 89, 88, 88, 87, 87, 86, 85, 85, 84, 84, 83, 82, 82, 81, 81, 80, 79, 79, 78, 78, 77, 76, 76, 75, 75, 74, 73, 73, 72, 72, 71, 70, 70, 69, 69, 68, 67, 67, 66, 66, 65, 64, 64, 63, 63, 62, 61, 61, 60, 60, 59, 58, 58, 57, 57, 56, 55, 55, 54, 54, 53, 52, 52, 51, 51, 50, 49, 49, 48, 48, 47, 46, 46, 45, 45, 44, 43, 43, 42, 42, 41, 40, 40, 39, 39, 38, 37, 37, 36, 36, 35, 34, 34, 33, 33, 32, 31, 31, 30, 30, 29, 28, 28, 27, 27, 26, 25, 25, 24, 24, 23, 22, 22, 21, 21, 20, 19, 19, 18, 18, 17, 16, 16, 15, 15, 14, 13, 13, 12, 12, 11, 10, 10, 9, 9, 8, 7, 7, 6, 6, 5, 4, 4, 3, 3, 2, 1, 1, 0, 0}.

It can be seen from the method provided by the above embodiments that, the present application scans a one-dimensional code image having a deflected angle by an embedded system, and directly makes the coordinates of the one-dimensional code image having the deflected angle correspond to an angle coordinate value of an obliquely positioned coordinate system corresponding to the deflected angle, thereby acquiring image feature data of the scanned image, which, on the one hand, reduces the time for the embedded system to correct the angle of the image, accelerates the speed of feature recognition for the one-dimensional code and improves user experience; while on the other hand, accelerates recognition speed for the one-dimensional code by using the soft decoding, avoids the cost spent by using hardware decoding and reduces the production cost for the one-dimensional code recognition.

FIG. 3 is a flowchart diagram of implementing the method for multi-angle scanning provided by another embodiment of the present application. As shown in FIG. 3, the executor of the method of this embodiment of the present application is an upper computer, and before acquiring the scanning angle when scanning the image to be scanned, the method may further include:

301. scanning, by the upper computer, the image with specified resolution horizontally or vertically, and acquiring standard pixel values of the image;

302. generating, by the upper computer, the standardly positioned coordinate system of the image according to the standard pixel values; and 303. saving, by the upper computer, the standardly positioned coordinate system multiplied by a plurality of linear slope equations to generate the obliquely positioned coordinate system set.

Specifically, a plurality of angles that may occur when a one-dimensional code is scanned are set according to actual experience, and the plurality of obliquely positioned coordinate systems with the angles and the coordinate values corresponding to each of the obliquely positioned coordinate systems are saved to the upper computer, such that the embedded system is able to call the coordinate values corresponding to the suitable obliquely positioned coordinate system so as to determine the image features of the one-dimensional code.

Compared with the previous one embodiment, the method provided by this embodiment saves the coordinate values of the angles, which facilitates the embedded system to call the coordinate values of the angles from the upper computer in time, thereby accelerating the processing speed and response speed of the embedded system scanning picture for the one-dimensional code.

It should be understood that, the sequence of the steps in the above embodiments does not imply a sequence of executions, and the sequence of executions of the processes should be determined by its function and internal logic, and should not be construed as limiting the implementation of the embodiments of the present application.

FIG. 4 is a schematic diagram of the device for multi-angle scanning provided by an embodiment of the present application. For convenience of illustration, only parts relevant to the embodiments of the present application are shown. As shown in FIG. 4, the executor of this embodiment of the present application is an embedded system end, and the device for multi-angle scanning provided by this embodiment of the present application may further include:

a first acquisition module 41, configured to acquire a scanning angle when scanning an image to be scanned;

a call module 42, configured to upload the scanning angle to an upper computer to call a suitable obliquely positioned coordinate system by the upper computer, where, the suitable obliquely positioned coordinate system is an obliquely positioned coordinate system in an obliquely positioned coordinate system set corresponding to a saved deflected angle having a smallest difference value with the scanning angle;

a reception module 43, configured to receive the suitable obliquely positioned coordinate system returned back by the upper computer; and a second acquisition module 44, configured to acquire image feature data of the image to be scanned by using coordinate values of pixels of the image to be scanned in the suitable obliquely positioned coordinate system.

FIG. 5 is a schematic diagram of the device for multi-angle scanning provided by another embodiment of the present application. For convenience of illustration, only parts relevant to the embodiments of the present application are shown. As shown in FIG. 5, the executor of this embodiment of the present application is an embedded system end, and the reception module of the device for multi-angle scanning provided by this embodiment of the present application may further include:

a backhauling unit 51, configured to receive the suitable obliquely positioned coordinate system returned back by the upper computer; and a save unit 52, configured to save the coordinate values of the suitable obliquely positioned coordinate system.

It should be noted that, the modules in the foregoing system provided by the embodiments of the present application are based on the same conception as the method embodiments of the present application, and the technical effects thereof are the same as the method embodiments of the present application. Therefore, detailed description may refer to description for the method embodiments of the present application, which will not be repeated herein again.

It can also be seen from the device provided by the above embodiments that, the present application scans a one-dimensional code image having a deflected angle by an embedded system, and directly makes the coordinates of the one-dimensional code image having the deflected angle correspond to an angle coordinate value of an obliquely positioned coordinate system corresponding to the deflected angle, thereby acquiring image feature data of the scanned image, which, on the one hand, reduces the time for the embedded system to correct the angle of the image, accelerates the speed of feature recognition for the one-dimensional code and improves user experience; while on the other hand, accelerates recognition speed for the one-dimensional code by using the soft decoding, avoids the cost spent by using hardware decoding and reduces the production cost for the one-dimensional code recognition.

FIG. 6 is a schematic diagram of the terminal device for multi-angle scanning according to an embodiment of the present application. As shown in FIG. 6, the terminal device 6 for multi-angle scanning in this embodiment includes: a processor 60, a memory 61 and a computer program 62 stored in the memory 61 and executable by the processor 60, for example, the computer program for implementing a method for multi-angle scanning. The processor 60, when executing the computer program 62, implements the steps of the various method embodiments for multi-angle scanning described above, such as steps from 101 to 104 as shown in FIG. 1. Alternatively, the processor 60, when executing the computer program 62, implements the functions of the various modules/units of the various device embodiments described above, such as the functions of modules from 41 to 44 as shown in FIG. 4.

The computer program 62, provided by the present application, configured for implementing a method for multi-angle scanning, includes: acquiring a standardly positioned coordinate system of a standard image; acquiring obliquely positioned coordinate systems having a plurality of deflected angles corresponding to the standardly positioned coordinate system through linear slope equations; sending one obliquely positioned coordinate system corresponding to an angle called by an embedded system to the embedded system; acquiring, by the embedded system, image feature data of a scanned image through a coordinate value of the angle of the obliquely positioned coordinate system corresponding to the scanned image. The computer program 62 may be divided into one or more modules/units, the one or more modules/units are stored in the memory 61 and executed by the processor 60 to complete the present application. The one or more modules/units may be a series of computer program instruction segments capable of performing a particular function, and the instruction segments are configured for describing the execution process of the computer program 62 in the terminal device 6 for multi-angle scanning. For example, the computer program 62 may be divided into a synchronization module, a summary module, an acquisition module, and a backhauling module (modules in a virtual device), and the specific function of each of the module is as follows:

The terminal device 6 for multi-angle scanning may be a computing device such as a desktop computer, a notebook, a palmtop computer and a cloud server and the like. The terminal device for multi-angle scanning may include, but is not limited to, the processor 60 and the memory 61. It will be understood by those skilled in the art that, FIG. 6 is merely an example of the terminal device 6 for multi-angle scanning, which does not constitute a limitation of the terminal device 6 for multi-angle scanning and may include more or less components than the illustration, or may combine certain components or different components. For example, the terminal device 6 for multi-angle scanning may also include an input device, an output device, a network access device, a bus and the like.

The processor 60 may be a central processing unit (CPU), or may be alternatively a general-purpose processor, a digital signal processor (DSP), an application specific integrated circuit (ASIC), a field-programmable gate array (FPGA), or alternatively a programmable logic device, a discrete gate device or transistor logic device, a discrete hardware component, etc. The general-purpose processor may be a microprocessor, or the processor may be any conventional processor or the like.

The memory 61 may be an internal storage unit of the terminal device 6 for multi-angle scanning, such as a hard disk or an internal storage of the terminal device 6 for multi-angle scanning. The memory 61 may also be an external storage device of the terminal device 6 for multi-angle scanning, such as a plug-in hard disk, a smart media card (SMC), a secure digital (Secure Digital, SD) card, or a flash card, etc. equipped on the terminal device 6 for multi-angle scanning. Further, the memory 61 may also include an internal storage unit of the terminal device 6 for multi-angle scanning as well as an external storage device. The memory 61 is configured to store computer programs and other programs and data required by the terminal device 6 for multi-angle scanning. The memory 61 may also be configured to temporarily store data that has been output or is about to be output.

It will be clearly understood by those skilled in the art that, for convenience and brevity of description, the division of the various functional units or modules described above is only exemplified. In practical applications, the above functions may be completed through assigning it to different functional units or modules according to needs. That is, the internal structure of the device is divided into different functional units or modules to perform all or part of the functions described above. The various functional units or modules in the embodiments may be integrated into one processing unit, or each of the units may exist physically separately, or two or more units may be integrated into one unit. The above integrated unit may be implemented in a form of hardware, or may be implemented in a form of software functional unit. In addition, the specific names of the respective functional units or modules are only for the purpose of facilitating mutual differentiation, and are not intended to limit the protection scope of the present application. In the specific working process of the units or the modules in the foregoing system, reference may be made to the corresponding process in the foregoing method embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary units and algorithm steps described in combination with the embodiments disclosed herein may be implemented by electronic hardware, or a combination of computer software and electronic hardware. Whether these functions are performed in hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus/terminal device and method may be implemented in other manners. For example, the apparatus/terminal device embodiments described above are merely illustrative. For example, the division of the modules or units is only a division for logical functions, and there may be other division manners in actual implementation, for example, a plurality of units or components may be combined or integrated into another system, or some features may be ignored or not executed. In addition, the mutual coupling or direct coupling or communication connection as shown or discussed may be indirect coupling or communication connection through some interfaces, devices or units, or may be electrical or mechanical, or may be in other forms.

The units described as separate components may or may not be physically separate. The components displayed as units may or may not be physical units, that is, may be located in one place, or may be distributed to a plurality of network units. Some or all of the units may be selected according to actual needs to achieve the purpose of the solutions of the embodiments.

In addition, the various functional units in each embodiment of the present application may be integrated into one processing unit, or each of the units may exist physically separately, or two or more units may be integrated into one unit. The above integrated units may be implemented in a form of hardware or in a form of a software functional unit.

The integrated module/unit, if implemented in the form of the software functional unit and sold or used as a stand-alone product, may be stored in a computer readable storage medium. Based on such understanding, the present application may implement all or part of the processes in the above embodiments through commanding related hardware by a computer program, and the computer program may be stored in the computer readable storage medium. The computer program, when executed by the processor, may implement the steps of the various method embodiments described above. Where, the computer program includes a computer program code, and the computer program code may be in a form of a source code, an object code, an executable file, or some intermediate forms. The computer readable medium may include: any entity or apparatus capable of carrying the computer program code, a recording medium, a USB flash disk, a removable hard disk, a magnetic disk, an optical disk, a computer memory, a read-only memory (ROM), a random access memory (RAM), an electrical carrier signal, a telecommunication signal, or software distribution media or the like. It should be noted that, the content contained in the computer readable medium may be appropriately increased or decreased according to requirements of legislation and patent practice in a jurisdiction. For example, in some jurisdictions, according to the legislation and the patent practice, the computer readable medium does not include the electrical carrier signal and telecommunication signal.

The above embodiments are only used to illustrate the technical solutions of the present application, and are not intended to be limiting. Although the present application has been described in detail with reference to the foregoing embodiments, those of ordinary skill in the art should understand that the technical solutions disclosed in the above embodiments may be modified, or some of the technical features may be replaced by equivalents. These modifications or substitutions do not depart corresponding technical solutions from the spirit and scope of the technical solutions of the embodiments of the present application, and should be included in the protection scope of the present application.

What is claimed is:

1. A method for multi-angle scanning, comprising:
    acquiring a scanning angle when scanning an image to be scanned;
    uploading the scanning angle to an upper computer to call a suitable obliquely positioned coordinate system by the upper computer, wherein the suitable obliquely positioned coordinate system is an obliquely positioned coordinate system in an obliquely positioned coordinate system set corresponding to a saved deflected angle having a smallest difference value with the scanning angle;
    receiving the suitable obliquely positioned coordinate system returned back by the upper computer; and
    acquiring image feature data of the image to be scanned by using coordinate values of pixels of the image to be scanned in the suitable obliquely positioned coordinate system.

2. The method according to claim 1, wherein, before acquiring the scanning angle when scanning the image to be scanned, the method further comprises:
    scanning, by the upper computer, the image with specified resolution horizontally or vertically, and acquiring standard pixel values of the image;
    generating, by the upper computer, a standardly positioned coordinate system of the image according to the standard pixel values; and
    saving, by the upper computer, the standardly positioned coordinate system multiplied by a plurality of linear slope equations to generate the obliquely positioned coordinate system set.

3. The method according to claim 2, wherein, the step of saving, by the upper computer, the standardly positioned coordinate system multiplied by a plurality of linear slope equations to generate the obliquely positioned coordinate system set specifically comprises:
    specifying a plurality of deflected angles configured to be saved by the upper computer;
    acquiring linear slope equations corresponding to the deflected angles according to each of the deflected angles;
    saving the standardly positioned coordinate system multiplied by the plurality of linear slope equations to generate the obliquely positioned coordinate system set; and
    saving coordinate values of each of the obliquely positioned coordinate systems.

4. The method according to claim 1, wherein, the obliquely positioned coordinate system corresponding to one saved deflected angle having the smallest difference value with the scanning angle specifically comprises:
    determining a section where the scanning angle is positioned, wherein the section is set by two of the saved deflected angles;
    determining one of the two of the deflected angles closest to the scanning angle as a suitable deflected angle; and
    acquiring the obliquely positioned coordinate system corresponding to the deflected angle according to the suitable deflected angle.

5. The method according to claim 1, wherein, the step of receiving the suitable obliquely positioned coordinate system returned back by the upper computer specifically comprises:
    receiving the suitable obliquely positioned coordinate system returned back by the upper computer; and
    saving the coordinate values of the suitable obliquely positioned coordinate system.

6. A device for multi-angle scanning, comprising:
    a first acquisition module, configured to acquire a scanning angle when scanning an image to be scanned;
    a call module, configured to upload the scanning angle to an upper computer to call a suitable obliquely positioned coordinate system by the upper computer, wherein the suitable obliquely positioned coordinate system is an obliquely positioned coordinate system in an obliquely positioned coordinate system set corresponding to a saved deflected angle having a smallest difference value with the scanning angle;

a reception module, configured to receive the suitable obliquely positioned coordinate system returned back by the upper computer; and a second acquisition module, configured to acquire image feature data of the image to be scanned by using coordinate values of pixels of the image to be scanned in the suitable obliquely positioned coordinate system.

7. The device according to claim 6, wherein, the device further comprises:

an acquisition unit, configured to scan, by the upper computer, the image with specified resolution horizontally or vertically, and to acquire standard pixel values of the image;

a first generation unit, configured to generate, by the upper computer, a standardly positioned coordinate system of the image according to the standard pixel values; and a second generation unit, configured to save, by the upper computer, the standardly positioned coordinate system multiplied by a plurality of linear slope equations to generate the obliquely positioned coordinate system set.

8. The device according to claim 6, wherein, the reception module comprises:

a backhauling unit, configured to receive the suitable obliquely positioned coordinate system returned back by the upper computer; and a save unit, configured to save the coordinate values of the suitable obliquely positioned coordinate system.

9. A terminal device for multi-angle scanning, comprising a memory, a processor and a computer program stored in the memory and executable by the processor, wherein the processor, when executing the computer program, implements the steps of:

acquiring a scanning angle when scanning an image to be scanned;

uploading the scanning angle to an upper computer to call a suitable obliquely positioned coordinate system by the upper computer, wherein the suitable obliquely positioned coordinate system is an obliquely positioned coordinate system in an obliquely positioned coordinate system set corresponding to a saved deflected angle having a smallest difference value with the scanning angle;

receiving the suitable obliquely positioned coordinate system returned back by the upper computer; and acquiring image feature data of the image to be scanned by using coordinate values of pixels of the image to be scanned in the suitable obliquely positioned coordinate system.

10. The terminal device according to claim 9, wherein, before acquiring the scanning angle when scanning the image to be scanned, the processor, when executing the computer program, further implements the steps of:

scanning, by the upper computer, the image with specified resolution horizontally or vertically, and acquiring standard pixel values of the image;

generating, by the upper computer, a standardly positioned coordinate system of the image according to the standard pixel values; and saving, by the upper computer, the standardly positioned coordinate system multiplied by a plurality of linear slope equations to generate the obliquely positioned coordinate system set.

11. The terminal device according to claim 10, wherein, the step of saving, implemented by the processor, specifically comprises:

specifying a plurality of deflected angles configured to be saved by the upper computer;

acquiring linear slope equations corresponding to the deflected angles according to each of the deflected angles;

saving the standardly positioned coordinate system multiplied by the plurality of linear slope equations to generate the obliquely positioned coordinate system set; and saving coordinate values of each of the obliquely positioned coordinate systems.

12. The terminal device according to claim 9, wherein, the obliquely positioned coordinate system corresponding to one saved deflected angle having the smallest difference value with the scanning angle specifically comprises:

determining a section where the scanning angle is positioned, wherein the section is set by two of the saved deflected angles;

determining one of the two of the deflected angles closest to the scanning angle as a suitable deflected angle; and acquiring the obliquely positioned coordinate system corresponding to the deflected angle according to the suitable deflected angle.

13. The terminal device according to claim 9, wherein, the step of receiving, implemented by the processor, specifically comprises:

receiving the suitable obliquely positioned coordinate system returned back by the upper computer; and saving the coordinate values of the suitable obliquely positioned coordinate system.

14. A computer readable storage medium stored with a computer program, wherein, the computer program, when executed by a processor, implements the steps of:

acquiring a scanning angle when scanning an image to be scanned;

uploading the scanning angle to an upper computer to call a suitable obliquely positioned coordinate system by the upper computer, wherein the suitable obliquely positioned coordinate system is an obliquely positioned coordinate system in an obliquely positioned coordinate system set corresponding to a saved deflected angle having a smallest difference value with the scanning angle;

receiving the suitable obliquely positioned coordinate system returned back by the upper computer; and acquiring image feature data of the image to be scanned by using coordinate values of pixels of the image to be scanned in the suitable obliquely positioned coordinate system.

15. The computer readable storage medium according to claim 14, wherein, before acquiring the scanning angle when scanning the image to be scanned, the computer program, when executed by a processor, further implements the steps of:

scanning, by the upper computer, the image with specified resolution horizontally or vertically, and acquiring standard pixel values of the image;

generating, by the upper computer, a standardly positioned coordinate system of the image according to the standard pixel values; and saving, by the upper computer, the standardly positioned coordinate system multiplied by a plurality of linear slope equations to generate the obliquely positioned coordinate system set.

16. The computer readable storage medium according to claim 15, wherein, the step of saving specifically comprises:
  specifying a plurality of deflected angles configured to be saved by the upper computer;
  acquiring linear slope equations corresponding to the deflected angles according to each of the deflected angles;
  saving the standardly positioned coordinate system multiplied by the plurality of linear slope equations to generate the obliquely positioned coordinate system set; and
  saving coordinate values of each of the obliquely positioned coordinate systems.

17. The computer readable storage medium according to claim 14, wherein, the obliquely positioned coordinate system corresponding to one saved deflected angle having the smallest difference value with the scanning angle specifically comprises:
  determining a section where the scanning angle is positioned, wherein the section is set by two of the saved deflected angles;
  determining one of the two of the deflected angles closest to the scanning angle as a suitable deflected angle; and
  acquiring the obliquely positioned coordinate system corresponding to the deflected angle according to the suitable deflected angle.

18. The computer readable storage medium according to claim 14, wherein, the step of receiving specifically comprises:
  receiving the suitable obliquely positioned coordinate system returned back by the upper computer; and
  saving the coordinate values of the suitable obliquely positioned coordinate system.

* * * * *